United States Patent
Davies et al.

(10) Patent No.: US 8,499,280 B2
(45) Date of Patent: *Jul. 30, 2013

(54) IDENTIFYING SOURCE CODE ELEMENTS FOR REFACTORING

(75) Inventors: Stephen A. Davies, Dublin (IE); Liam Smyth, Dublin (IE); Paul Thomas, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,719

(22) Filed: Mar. 5, 2012

(65) Prior Publication Data
US 2012/0167040 A1    Jun. 28, 2012

Related U.S. Application Data

(63) Continuation of application No. 12/853,244, filed on Aug. 9, 2010.

(30) Foreign Application Priority Data

Aug. 7, 2009  (EP) .................................. 09167482

(51) Int. Cl.
*G06F 9/44*  (2006.01)

(52) U.S. Cl.
USPC ........................... 717/110; 717/120; 717/124

(58) Field of Classification Search
None
See application file for complete search history.

(56) References Cited

U.S. PATENT DOCUMENTS

| | | | | |
|---|---|---|---|---|
| 5,673,390 A * | 9/1997 | Mueller | ........................... | 714/57 |
| 5,701,487 A * | 12/1997 | Arbouzov | ..................... | 717/124 |
| 6,698,013 B1 * | 2/2004 | Bertero et al. | ................ | 717/127 |
| 6,757,893 B1 * | 6/2004 | Haikin | ......................... | 717/170 |
| 6,804,682 B1 * | 10/2004 | Kemper et al. | ............... | 717/120 |
| 7,370,318 B1 * | 5/2008 | Howe et al. | .................. | 717/110 |
| 7,451,439 B2 * | 11/2008 | Nickell et al. | ................ | 717/140 |
| 7,840,944 B2 * | 11/2010 | Brunswig et al. | ............ | 717/124 |
| 8,006,229 B2 * | 8/2011 | Shinomi | ....................... | 717/110 |
| 8,201,157 B2 * | 6/2012 | Wagner et al. | ............... | 717/140 |
| 8,312,430 B2 * | 11/2012 | Best et al. | ..................... | 717/120 |
| 2004/0153994 A1 * | 8/2004 | Bates et al. | ................... | 717/110 |
| 2006/0212857 A1 * | 9/2006 | Neumann et al. | ............ | 717/140 |

(Continued)

OTHER PUBLICATIONS

Yu, Yijun; Dayani-Fard, Homy; Mylopoulos, John, Removing False Code Dendecies to Speedup Software Build Processes, [Online] Proceedings of the 2003 conference of the Centre for Advanced Studies on Collaborative research, [Retrieved from the Internet on Mar. 7, 2013], <http://dl.acm.org/citation.cfm?id=961375> 10 pages.*

(Continued)

*Primary Examiner* — Thuy Dao
*Assistant Examiner* — Ravi K Sinha
(74) *Attorney, Agent, or Firm* — Patents On Demand, P.A.; Brian K. Buchheit; Scott M. Garrett

(57) ABSTRACT

A solution for identifying build errors associated with a source code file for determining source code elements for refactoring. An embodiment of the invention utilizes a source code management system in combination with build logs generated by a build environment to determine source code elements that would benefit from refactoring.

16 Claims, 6 Drawing Sheets

U.S. PATENT DOCUMENTS

| | | | |
|---|---|---|---|
| 2007/0038982 A1* | 2/2007 | Andrews et al. | 717/124 |
| 2008/0028367 A1* | 1/2008 | Cary et al. | 717/124 |
| 2008/0120598 A1* | 5/2008 | Imeshev | 717/120 |
| 2008/0244522 A1* | 10/2008 | Bernin | 717/122 |
| 2009/0064100 A1* | 3/2009 | Schiefer | 717/110 |
| 2009/0133006 A1* | 5/2009 | Cheung | 717/144 |
| 2010/0070948 A1* | 3/2010 | Rama et al. | 717/105 |
| 2010/0153914 A1* | 6/2010 | Arsanjani et al. | 717/110 |

OTHER PUBLICATIONS

Munson, J.C.; Elbaum, S.G., Code Churn: a Measure for Estimating the Impact of Code Change, [Online] International Conference on Software Maintenance, 1998. Proceedings., [Retrived from the Internet on Mar. 7, 2013], <http://ieeexplore.ieee.org/xpls/abs_all.jsp?arnumber=738486> 8 pages.*

* cited by examiner

IDENTIFYING SOURCE CODE ELEMENTS FOR REFACTORING

CROSS-REFERENCE TO RELATED APPLICATIONS

This application is a continuation of U.S. patent application Ser. No. 12/853,244, filed Aug. 9, 2010 (pending), which is incorporated herein in its entirety. The application claims the benefit of European Patent Application No. 09167482.0 filed 7 Aug. 2010 and entitled "A Method and Apparatus for Identifying Source Code Elements for Refactoring", which is assigned to the assignee of the present application, and the teachings of which are hereby incorporated by reference in their entirety.

BACKGROUND

The disclosure relates to the field of software development and, more particularly, to identifying source code elements for refactoring.

Large modern software development projects are often developed from complex designs. Often, a software development project can become very complex as the design evolves from the prototype stage to the 'fully fledged' commercialization of the software project. Thus, when developers write code based upon a complex design errors are inevitable. Often, the complexity of the design increases as the software moves from prototyping to commercialization because of additional functionality that is incorporated into the prototype, or oversights shortcomings in the design that become exposed to designers and developers over time. In order to overcome these problems a number of methodologies are deployed which encourage both the setting up of a build system for continuous building of the source code to ensure that the source code files can be built together, whilst also encouraging the use of refactoring cycles throughout the life cycle of the software project.

A large amount of information can be generated during the build process of a software project, but very often this information is only used for the current build of the source code. Build information can inform a developer that there is an error located at a specific line in a source code file. However, the information is at a very rudimentary level and does not provide information as to the exact cause of the error or other statistical information associated with the error. For example, when compiling a first source code file with a second source code file, the compiler detects an error in the first source code file—is the error caused by an error in the first source code file or due to a dependency on a method in a second source code file?

SUMMARY

Numerous aspects of the disclosure are contemplated which can be optionally implemented in various embodiments of the disclosure. Not all aspects are present in every embodiment, and described aspects are expected to be tailored and adapted for specific implementations. Thus, the various aspects and details expressed herein, when taken as a whole, permit one of ordinary skill in the art to grasp the scope of the present disclosure, which is defined more succinctly by the claims. It should be understood that nothing in this brief summary or detailed description is meant to be construed in a manner that limits the scope of the claimed content expressed herein.

One aspect of the disclosure is provides a data processing apparatus for identifying source code build errors associated with a source code file for determining source code elements for refactoring, the apparatus comprising: a means for identifying an error associated with a build operation of a build management system; a means for interfacing with a source code management system for locating a source code file associated with the identified error; a means for analyzing the source code file to identify the identified error associated with the source code file; a means for analyzing historical metadata associated with the identified error from the source code file; a means for identifying from the historical data whether the source code associated with the identified error has been amended since a last logged successful build operation; means for identifying a source code construct dependency associated with the source code of the identified error and locating the source code file associated with the source code construct in response to a negative determination being made; means for identifying from the historical data associated with the identified source code file whether the source code associated with the identified error has been amended since a last logged successful build operation; and means for logging the identified error with the identified error's historical data for further analysis, in response to a positive determination.

In one embodiment, the disclosure provides a data processing apparatus further comprising means for parsing a source code dependency hierarchy in order to identify the root cause of an error identified in a build operation.

In one embodiment, the disclosure provides a data processing apparatus wherein the build operation comprises a compiler generated error.

In one embodiment, the disclosure provides a data processing apparatus further comprises means for analyzing the logged historical data and generating a report detailing statistical analysis associated with the identified root cause of the error and wherein the statistical analysis details elements of source code that requires refactoring.

In one embodiment, the disclosure provides a data processing apparatus wherein, the statistical analysis of the generated report is input into a refactoring engine for refactoring the source code associated with the identified error.

In one embodiment, the disclosure provides a data processing apparatus wherein a build operation outputs a build log identifying source code elements that did not compile successfully.

In one embodiment, the disclosure provides a data processing apparatus further comprising a configuration means for configuring the refactoring identification component for operability with a proprietary source code control management system and a proprietary build management system.

In one embodiment, the disclosure provides a data processing apparatus wherein the build operation comprises a network failure generated error.

In one embodiment, the disclosure provides a data processing apparatus comprising means for logging a completed build operation and metadata associated with the completed build operation in response to a build operation being determined as completed.

Viewed from a second aspect, the disclosure provides a method for identifying build errors associated with a source code file for determining source code elements for refactoring, the apparatus comprising: identifying an error associated with a build operation of a build management system; interfacing with a source code management system for locating a source code file associated with the identified error; analyzing the source code file to identify the identified error associated with the source code file; analyzing historical metadata associated with the identified error from the source code file; identifying from the historical data whether the source code associated with the identified error has been amended since a last logged successful build operation; identifying a source code construct dependency associated with the source code of the identified error and locating the source code file associated with the source code construct in response to a negative determination being made; identifying from the historical data associated with the identified source code file whether the source code associated with the identified error has been amended since a last logged successful build operation; and logging the identified error with the identified error's historical data for further analysis, in response to a positive determination.

In one embodiment, the disclosure provides a method further comprising parsing a source code dependency hierarchy in order to identify the root cause of an error identified in a build operation.

In one embodiment, the disclosure provides a method wherein the build operation comprises a compiler generated error.

In one embodiment, the disclosure provides a method further comprising analyzing the logged historical data and generating a report detailing statistical analysis associated with the identified root cause of the error and wherein the statistical analysis details elements of source code that requires refactoring.

In one embodiment, the disclosure provides a method wherein, the statistical analysis of the generated report is input into a refactoring engine for refactoring the source code associated with the identified error.

In one embodiment, the disclosure provides a method wherein a build operation outputs a build log identifying source code elements that did not compile successfully.

In one embodiment, the disclosure provides a method further comprises a configuring the refactoring identification component for operability with a proprietary source code control management system and a proprietary build management system.

In one embodiment, the disclosure provides a method wherein the build operation comprises a network failure generated error.

In one embodiment, the disclosure provides a method further comprising the steps of logging a completed build operation and metadata associated with the completed build operation in response to a build operation being determined as completed.

Viewed from a second aspect, the disclosure provides a computer program product loadable into the internal memory of a digital computer, comprising software code portions for performing, when said product is run on a computer, to carry out the invention as described above.

DETAILED DESCRIPTION

Figure 1:
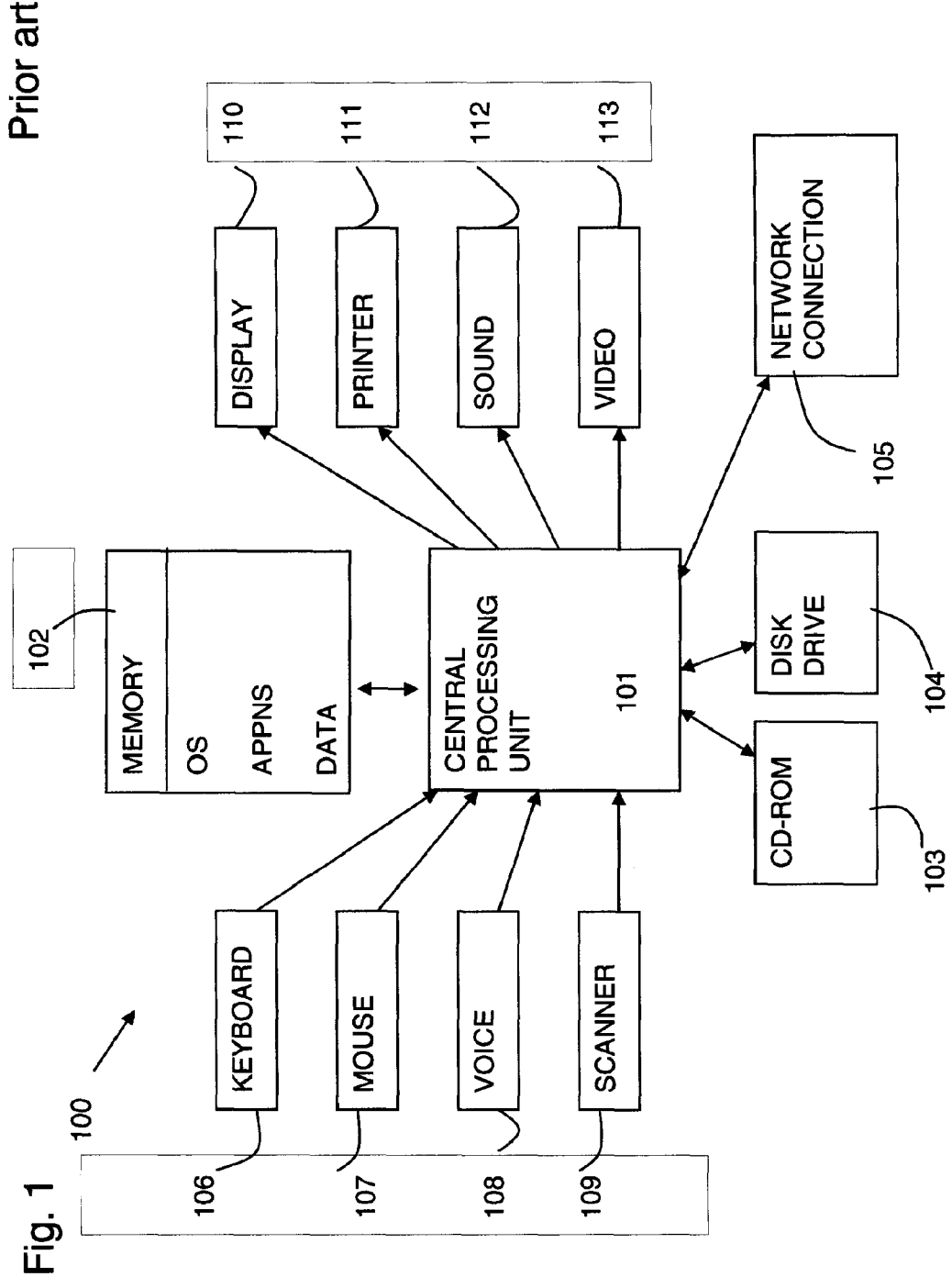
FIG. 1 is a data processing system in which an embodiment of the disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 illustrates a typical data processing system in which an embodiment of the disclosure may be embodied.

The data processing system 100 comprises a central processing unit 130 with primary storage in the form of memory 105 (RAM and ROM). The memory 105 stores program information and data acted on or created by software applications. The memory may be implemented as a non-transitory, physical storage medium. The application information comprises operating system code for the data processing system 100 and object code for applications running on the computer system 100. Secondary storage comprises optical disk storage and magnetic disk storage. Data and application information can also be stored and accessed from the secondary storage.

The data processing system 100 comprises a network connection means 105 for interfacing the data processing system 100 to a network 125. The data processing system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics or the like. Outputs from the central processing unit 101 may include a display means 110, a printer 111, sound output 112, video output 113, etc.

Applications may run on the data processing system 100 from storage means 104 or via a network connection 105 connected to a further storage means (not shown). In an embodiment of the disclosure the application code comprises a modified build management system for interpreting information from an output generated from the modified build management system and a source code management system in order to identify source code elements for refactoring.

Figure 2:
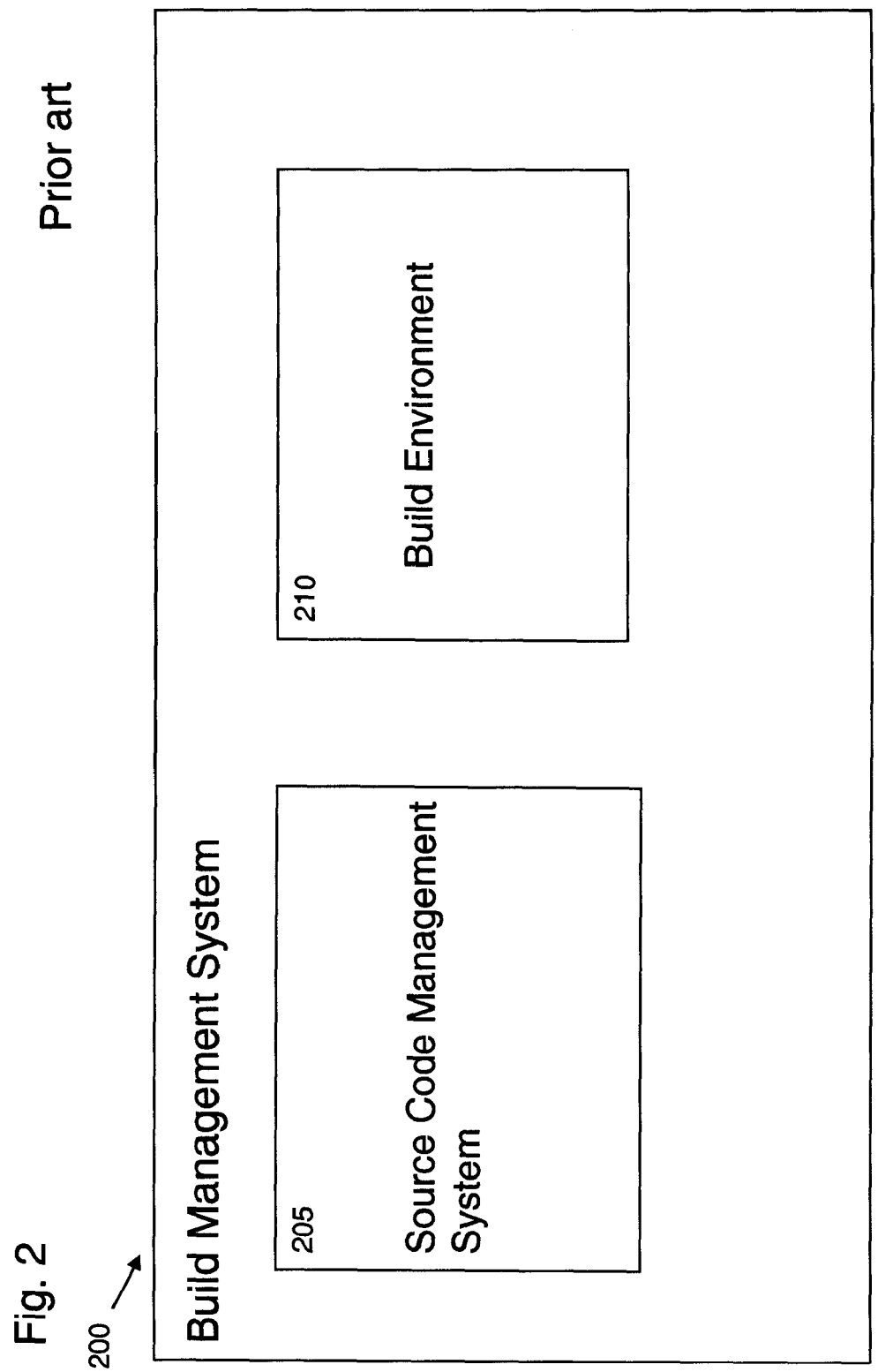
FIG. 2 is a block diagram illustrating a known build management system in which an embodiment of the disclosure may be embodied.

In order to place the disclosure in context FIG. 2 illustrates the functionality of a build management system within which the disclosure can operate in accordance with one contemplated embodiment.

Build management system 200 can comprise a source code control management system 205 and a build environment 210. The source code management system 205 can comprise a means for storing, retrieving and updating source code written by developers. The source code management system 205 can comprise a means for interfacing with an integrated development environment for writing source code in a language of the developer's choice. When a developer has created a new source code listing (as contained within a source code file) or made changes to an existing source code listing, the source code listing in question is stored in the source code management system 205. Each piece of source code that is submitted 'or checked in' to the source code management system 205 is given a version number and stored in a database with additional information such as identifier of a developer, the particular change that has been made to the source code. For example, which line of source code or which element(s) of source code has changed, and the date and time the source code was 'checked into' the source code management system 205.

The source code management system 205 can categorizes and can store source code listings on a 'project' basis. Thus, for each project there may be one or more source code files. Each source code file comprises a source code listing broken down into functions. Each function may have a developer associated with it and each function may have a different version number. For example, a function 'A' may be stored as version 1, and function 'B' may be stored as version 1.a. This change in version numbering is because function 'B' required additional coding because of detected bugs and these bugs have been fixed in version 1.a. Therefore, each time an update to a source code function is 'committed' to the Source Code Control System the source code is stored in a source code data store and given a version number.

In order to create an audit trail of changes that are made to source code listings, the source code management system 205 associates metadata with each change that is committed to the source code data store.

The metadata comprises information such as the date and time of the change, a means of identifying the developer that made the change to the source code, the version number of the source code change and any additional information that is required. Typically, the source code management system 205 uses a centralized model, where each of the version control functions is performed on a shared data processing system, such as a server. If more than one software developer, at the same time, attempts to make a change to the same source code file the source code management system 205 will use some form of file locking or version merging so that a software developer does not overwrite the changes made by the another software developer and hence conflicts will be kept to a minimum.

In use, the source code management system 205 detects that a change has been made to, for example, a function or element of source code within a source code file. The change is stored as a discrete delta. Typically, the deltas resulting from a series of changes are strung together in a chain of deltas. When a new module is coded, it is said to be a release and each new delta represents a new level of that release.

Below, Example 1, illustrates an extract of source code listing with associated metadata as stored in the source code repository is shown in FIG. 2.

Example 1

Source Code

```
testClass.java and testExtension.java
1. public class testClass extends testExtension
2. {
3.   public void testCall( )
4.   {
5.     this.TestMethod( );
6.   }
7. }
=-
1. public class testExtension
2. {
3.   public Object testMethod( )
4.   {
5.     return null;
6.   }
7. }
```

Metadata

```
testClass.java, line 5, modified by testUser, 13/03/2008 18:43
was
    5.   this.testMethod( );
now
    5.   this.TestMethod( );
testExtension.java, line 5, added by testUser, 12/03/2008 11:25
    5.   return null;
```

Example 1 illustrates two files comprising source code written in the Java programming language (Java is a trademark of Sun Microsystems in the U.S. and other countries). Beneath the source code listing is a sample of the type of metadata that may be associated with one or more elements of source code in a source code listing. The metadata example given shows that at line five of the source code listing for the file testClass.Java a test user amended the method from this.testMethod( ); to this.TestMethod( ). The metadata also details at what date and time the amendment to line 5 was made and by who.

Moving onto the build environment 210, which typically comprises tools required by a software developer to compile the source code contained within a source code file into an executable file so that it can be run on a data processing system 100.

The compilation of the source code involves a compiler transforming the source code into object code. Often, this process is automated by the build environment 210. Typically, tools within the build environment 210 continuously monitor the source code data store in order to detect changes made to the source code. When a change has been detected, a compiler action is triggered and the compiler compiles the source code into object code. Typically, a compiler parses each line of source code and performs operations such as lexical analysis, preprocessing, semantic analysis, code generation and code optimization. As the compiler reads and parses each source code file, the compiler outputs a build log file.

The build log file details information such as the name of the file that has been compiled and other information associated with a build failure occurring in one or more compiler type operations. For example, if the compiler detects a syntax error—then this error is reported in the build log file. Thus the build log file is a report on the correctness of the source code as defined by one or more compiler operations.

The following examples detail excerpts of a typical build log file and the types of error messages that may be reported in the build log file.

Example 2

Syntax Error

```
testClass.java and testExtension.java
public class testClass extends testExtension
{
  public void testCall( )
  {
    this .TestMethod( );
  }
}
=-
public class testExtension
{
  public Object testMethod( )
  {
    return null;
  }
}
=-
```

The following is an example of the type of information that is reported in the build log file for the above source code.

Build Log

```
testClass.java:6: cannot resolve symbol
symbol : method TestMethod ( )
location: class testClass
    this.TestMethod( );
          ^
=-
```

The build log file above reports an error of the type 'cannot resolve symbol'. This error is located on line 6 of the file testClass.java. However, the build log does not provide any information on precisely what element/constructs is causing the error.

Example 3

```
Public class testClass extends testExtension
{
  public void testCall( )
  {
    try
    {
      this.testMethod( );
    }
  }
=-
```

Build Log

```
Build log reports the following:
testClass.java:6: 'try' without 'catch' or 'finally'
    try
    ^
```

-continued

```
testClass.java:10: '}' expected
}
 ^
=-
```

The build log in this example (Example 3) is reporting that syntax rules require that whenever a 'try' construct is used than this should be followed by a 'catch' or a 'finally' construct. Thus this is not the case in the source code listing above and the build log reports this error.

Example 4

```
testClass.java and testExtension.java
public class testClass extends testExtension
{
  public void testCall( )
  {
    int i = this.testMethod( );
  }
}
=-
public class testExtension
{
public String testMethod( )
{
```

Build Log

```
testClass.java:5: incompatible types
found : java.lang.String
required: int
int i = this.testMethod( );
              ^
=-
```

The build log in this example (Example 4) is reporting an error because this.testMethod has been defined as a string in testExtension.java. However, in testClass.java this same method is defined so as to return an integer when in fact a string should be returned. Thus, the build log file reports an error of incompatible types.

Figure 3:
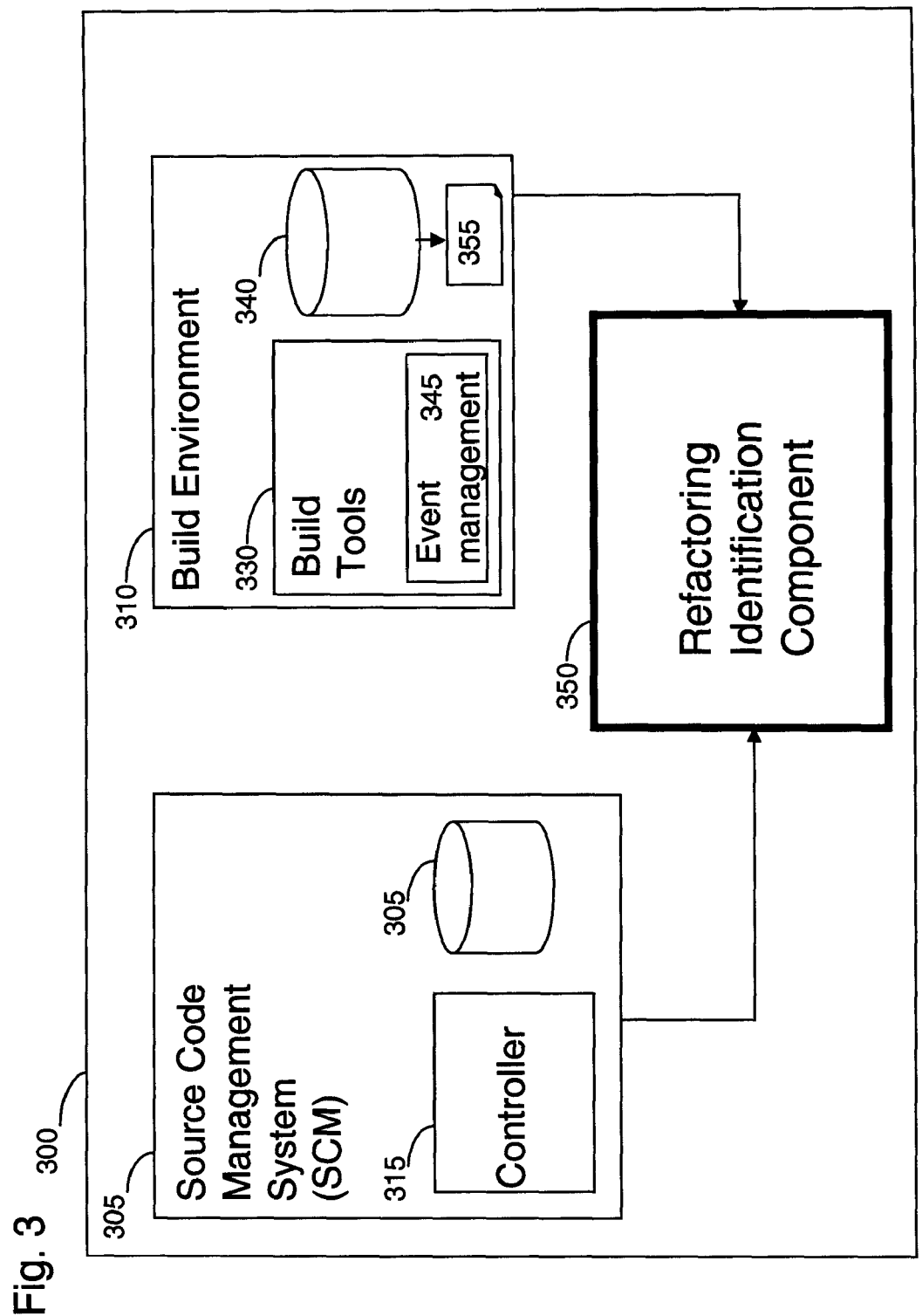
FIG. 3 is a block diagram illustrating a refactoring identification component in accordance with an embodiment of the disclosure.

Moving onto to FIG. 3, an embodiment of the disclosure is illustrated in which a modified build management system 300 is shown. The modified build management 300 system comprises a source code management system 305, a controller component 315 for managing source code that is 'committed' to a source code data store 320 for storage and retrieval purposes. The controller component 315 also applies a timestamp to a source code file each time a source code file is committed to the source code data store 320. The source code is stored with identification data of the developer The modified build management system 300 further comprises a build environment 310, comprising build tools 330 for compiling source code into object code, an event management component 345 for detecting when a change to a source code file has been made (hence a new version of the source code is created) in order to automatically trigger the build tool to compile the source code into object code and a data store 340 for storing build logs created as the output from a compiler process performed by a complier tool. The modified build management system 300 further comprises a refactoring identification component (RIC) 350. The RIC 350 interfaces and communicates with the source code management system 305 and the build environment 310. The RIC 350 is operable for operating in a standalone manner as a 'plugin' to existing build management systems 200 or as an integrated module to a build management system 200.

The RIC 350 is also operable for communicating with software agents installed on client devices having compiler tools for locally compiling source code. Thus, via the software agents the RIC 350 has the capability to access build logs stored on a plurality of client devices. Alternatively, the RIC 350 provides a communication channel in which client devices (now shown) can upload build logs generated via locally stored compiler programs.

The RIC 350 is operable for analyzing build logs 355 to identify build errors and interfacing with a source code management 205 system to identify the cause of the identified error to provide further contextual information associated with the error in order to identify source code fragments for refactoring.

Figure 4:
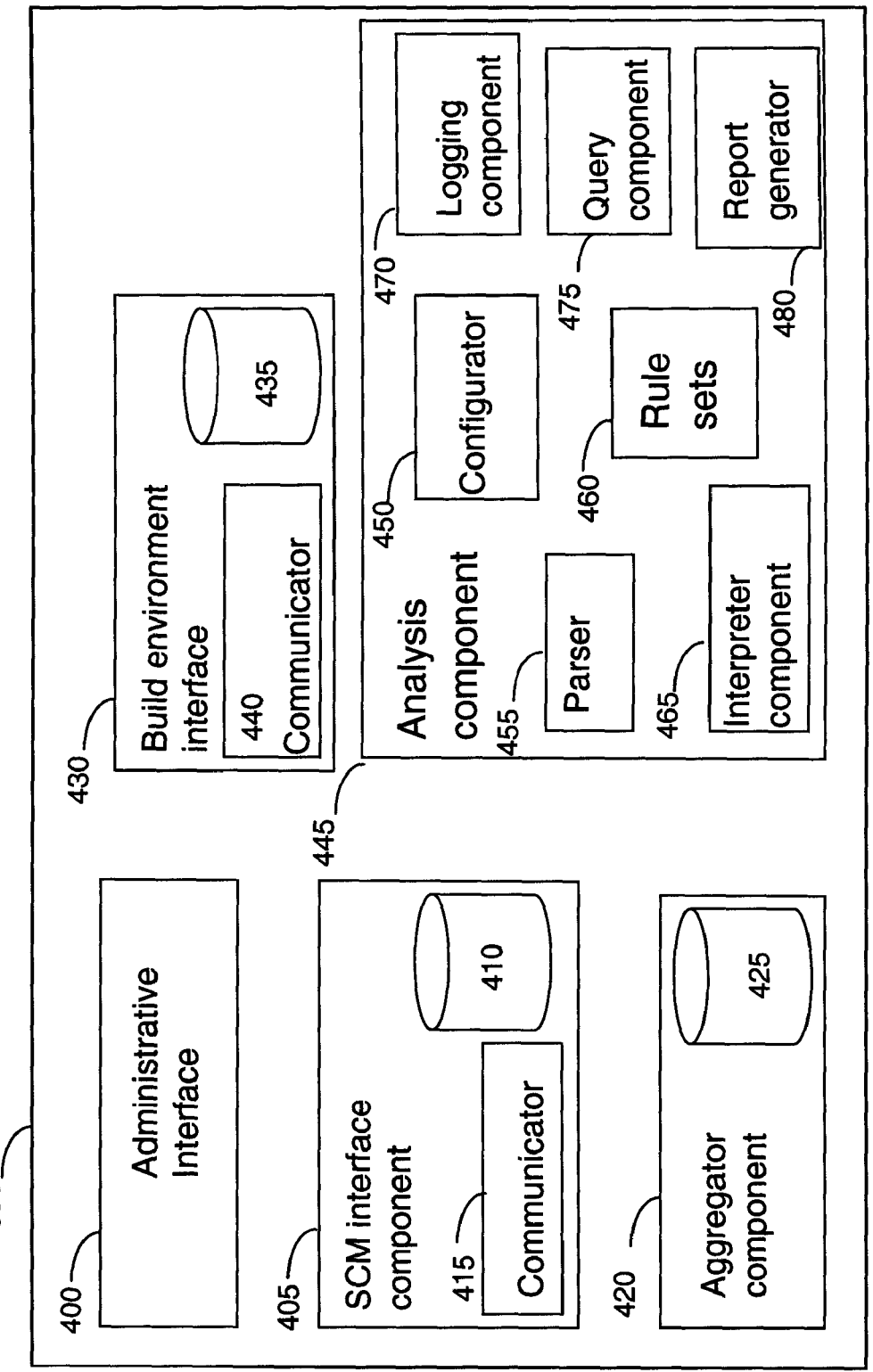
FIG. 4 is a bock diagram illustrating the components of the refactoring identification component in accordance with an embodiment of the disclosure.

FIG. 4 illustrates the sub components of the RIC component 350. These components are an administrative interface 400, an SCM interface component 405 comprising sub components 415 and 410, an aggregator component 420 comprising a data store 425 and a communicator component 440, a build interface component 430 and an analysis component 445 comprising sub components of a parser component 455, an interpreter component 465, a rule set component 460, a configurator component 450, a query component 475 and a report generator 480. Each of these components interfaces and communicates with each other in order to provide the novel and inventive aspects of the disclosure.

Starting with the administrative interface 400, the interface comprises means for which an administrator can configure the RIC 350 to produce a variety of reports. The administrative interface 400 comprises functionality which allows a user of the modified build management system 300 to select data in a drill down manner to generate customized reports.

Reports can be generated that identify aspects of the build environment 310 that would benefit for refactoring. Reports can be generated showing the causes of compiler errors generated by a compiler in a build operation, or reports can detail other identified build environment problems such as network failures and other hardware/software failures. Below is an example of the types of reports that can be generated. For example, on successful completion of a build operation the build report can be generated which details:

Information detailing elements of the build environment that have changed since last identified successful build operation.

Information regarding developers that submitted source and which features changes/problem report fixes (depending on the source code management system used and development coding guidelines).

A build report identifying the types of build failures and estimation of which developer may have caused the build failure.

A listing of each build failure and for each build failure who may have caused the build failure.

Weekly/monthly reporting depending on current position in Development schedule. For example, User: TestUserA responsible for 62% of build failures
User: TestUserC responsible for 32% of build failures
User: TestUserK responsible for 14% of build failures.
64% of build failures occurred on a Friday
TestClass.java responsible for 54% of build failures
TestExtension.java responsible for 31% of build failures
82% of build failures occurred in component [Front End]

8% of build failures occurred in component [web services]

0% of build failures occurred in component infrastructure]

Queries

It is also possible to set up a number of different queries from the administrative interface. As well as key queries on a wide range of options, queries can also be set up to provide reports of on date ranges etc. Examples of the types of queries are as follows:

Run a query on a particular source code file.

How many times did this source code file cause or was a part of a build failure(s) (% percentage of overall failures).

How many developers were working on this source code file

Run queries on build failures over date range.

Breakdown of the types of failures.

Breakdown of which source codes files/components involved

How many times did this developer potentially cause or was part of build failures (% percentage of overall failures)

Of overall development cycle, how much checking activity is a developer responsible for.

Which components did a developer work on (depends on architecture of product).

Run a query on as source code component/function (depends on architecture of product).

How many times was this component identified as part of a build failure(s)(% percentage of overall failures).

Compared to other components where does it sit in terms of the cause of overall build failures All of the above examples allow the system to make a judgment on wide range areas which would benefit from refactoring, for example, Coding guidelines/practice Developers adherence to architecture/coding standards Architecture/product layout problem areas Developer scheduling practice (breakdown of development team deployments).

The administration interface 400 further comprises means for selecting the type of build environment 310 that the RIC 350 is to interface with, what type of Source Code Management System 305 that the RIC 350 is to interface to, what type of programming language is being used i.e., Java, C++, Ruby on Rails etc. and which source code files and versions are to be analyzed etc. Different syntax/construct etc. are loaded into the ROC 350 depending on the programming language that the source code has been developed in. Further configuration may comprise the entering of authentication information in order to gain access to the modified build management system 300.

The SCM interface component 405 comprises means for communicating with a source code management system 305 for accessing a source code data store in order to locate one or more source code files as identified in a build log. Source code management systems 305 differ in their configurations etc. and many companies have their own proprietary systems. However, the SCM interface component 405 is in communication with the administrative interface 400 and receives instructions from the administrative interface 400 regarding the type of the source code management system it is to communicate with. On receiving this instruction the SCM interface component 405 performs a looks up in a database for the configuration details of the source code management system 305 and extracts logic from the database on order to communicate effectively with the source code data store via customized API calls.

The build environment interface 430 operates in very much the same manner as the SCM interface component 405, in that it receives instructions from the administrative interface 400 regarding the type of build management environment 310 it is to communicate with. The build environment interface component 430 also comprises a data store for looking up configuration logic associated with the type of build environment that it is instructed to communicate to. On receiving the configuration logic the configurator component 450 configures a communicator component 440 in order to configure communication ports in order to effectively send and receive messages from the chosen build environment.

The aggregator component 420, as its name suggests, aggregates the identified build logs with the requested source code files. A build log is an identified build log when a build error is detected. The aggregator component 420 works closely with the analyses component 445. This is because as a build error is identified and logged by the aggregator component the associated source code file is requested from the source code management system 300 by the SCM interface component 305. However, when the analysis component 445 analyses the source code file and determines that, for example, a method within the source code file has a dependency on another method—then the source code file comprising this dependency is identified and is retrieved from the source code management system. Thus, the aggregator component 420 waits for instructions from the analysis component 445 to retrieve further source code files. Once received the aggregator component 420 stores the source code files and the build log files in the data store in a manner which provides fast and efficient storage and retrieval.

The analysis component 445 commences operation when a build log is stored in the aggregator's data store. The parser component 455 begins by parsing the build log to identify the error message and also which source code file has generated the error. The parser component 445 sends a message to the aggregator component 420 to go and retrieve the identified source code file. On receipt of the source code file the parser component 455 begins to parse the source code file to identify the cause of the error by utilizing the rule set component 460. The rule sets define the logic which enables the interpreter component 465 to interpret the type of error reported in the build log file and to begin a process of interrogation and discovery in order to identify the root cause of the error reported in the build log.

In an embodiment the parser component 455 begins by parsing the build log file to locate a reported error. Once a reported error is located the parser component 455 communicates with the interpreter component 465 and passes to the interpreter component 465 any additional information associated with the identified error as reported in the build log file. Additional information comprises the name of the source code file which has been compiled and information such as the line number at which the error occurred.

The interpreter component 465 communicates with the SCM interface component 405 and instructs the SCM interface component 405 to locate in the source code management system 305 the source code file identified in the build log. The SCM interface component 405 returns the identified source code file and stores the source code file in the data store 410. The interpreter component 465 instructs the parser component to parse the stored source code file at the identified line number of the identified error. The parser component 465 also locates any metadata associated with the source code element identified at the particular line number. If the parser component 455 locates metadata then the parser component 455 identifies from the metadata the unique identifier associated with the developers who was identified as writing the source code and at what date was the source code committed to the source management system 305. The parser component 455 may then perform a lookup operation in an additional table to identifier the developers name using the unique identifier as an index look-up.

The parser component 455 also determines whether the source code had been amended before or after the last successful build operation. This is achieved by logging information associated with each build that is completed. As a build will complete either having no identified errors (successful) or will complete with identified errors (not successful) the parser component will communicate this information to the aggregator component 420 for storing. The information will also include data such as which aspects of the source code listing have changed since the last build operation. By aspects it is meant changes to source code listings, new, amended or deleted source code files, source code file name changes, a different developer developing the source code etc. All this information and other types of build related information is collected and stored by the aggregator component 420 in a data store 425

If the source code has not changed since the last successful build then the parser component needs to identify any dependency that the identified line of source code may have on another source code construct. For example, a dependency may be on another method instantiated in an additional source code file. This additional source code file would need to be obtained from the source code management system and parsed to identify the dependency. Once the parser component 465 has identified the dependency—then the interpreter component 465 locates any metadata associated with the dependency construct and identifies who wrote the line of source code that the dependency is contained within and at what date and time. Further, the parser component 455 identifies when that dependency has changed i.e. been amended, changed, replaced, introduced since the last successful build operation. This process continues until the exact cause of the error is identified.

Below are examples of three types of rules sets that can be implemented to identify the exact cause of the errors in the source code examples of Examples 2 to 4.

Example 5

Three rule set examples, with earlier examples of source code and build errors repeated.
Rule Set 1
Rule set: cannot resolve symbol: Type method
Source Code

```
testClass.java and testExtension.java
public class testClass extends testExtension
{
  public void testCall( )
  {
    this.TestMethod( );
  }
}
=-
public class testExtension
{
  public Object testMethod( )
```

-continued

```
  {
    return null;
  }
}
=-
```

Example of an Excerpt of an Example Build Log for the Above Source Code Listing

```
testClass.java:6: cannot resolve symbol
   symbol : method TestMethod ( )
   location: class testClass
       this.TestMethod( );
```

An Example of a Rule Set: Cannot Resolve Symbol: Type Method

```
locate line 6 in source code.
check line history
record line last changed and by who and when.
record whether line change has occurred before or after last successful build.
locate method in current class
parse class declaration
locate extended class : testExtension
unable to locate method : TestMethod
check file history
record lines last changed since last successful build and by whom.
record noted summary : no changes in class testExtension since last successful build
record noted summary : line 6 in testClass has changed since last successful build
-=========================================-
```

Rule Set: Try without Catch and Expected
Source Code

```
public class testClass extends testExtension
{
  public void testCall( )
  {
    try
    {
      this.testMethod( );
    }
}
=-
```

When build is called we get

```
testClass.java:6: 'try' without 'catch' or 'finally'
   try testClass.java:10: '}' expected
   }

=-
``` ruleSet: Try without Catch and Expected

```
=-
locate lines 6 to 10 in source code.
check line history
record line last changed and by who and when.
record whether line change has occurred before or after last successful
build.
summary scan from line 10 to end of file
record line last changed and by who and when.
record whether lines changed has occurred before or after last successful
build.
scan histories from line 7 to end of file from last successful build to present
record for each history group when and who, matched brackets counts
-=======================================-
``` ruleSet: Incompatible Types
Source code

```
testClass.java and testExtension.java
public class testClass extends testExtension
{
  public void testCall( )
  {
    int i = this.testMethod( );
  }
}
=-
public class testExtension
{
  public String testMethod( )
  {
    return "";
  }
}
=-
```

An Excerpt of an Example Build Log Reporting an Error for the Above Source Code

```
testClass.java:5: incompatible types
found : java.lang.String
required: int
int i = this.testMethod( );
                         ^
=-
```

An example of a rule set for the above identified error
ruleSet: incompatible types

```
=-
locate line 5 in source code.
check line history
record line last changed and by who and when.
record whether line change has occurred before or after last successful build.
locate method in current class
parse class declaration
locate extended class : testExtension
method found : testMethod
check file history of method
record lines last changed since last successful build and by who.
record noted summary : no changes in class testClass since last successful
build
record noted summary : line 3 and 5 in testExtension has changed since
last successful build
```

Once the rules sets have been used in conjunction with the parser component 455 and the aggregator component 420, information is recorded in the data store concerning the history associated with a source code file i.e. what changes have been made to a source code file, what errors were located in the source code file, whether the error was due to a construct in the source code file being dependent on another contrast located in a further source code file, who made the changes attributed to the identified error in the source code file etc.

Figure 5:
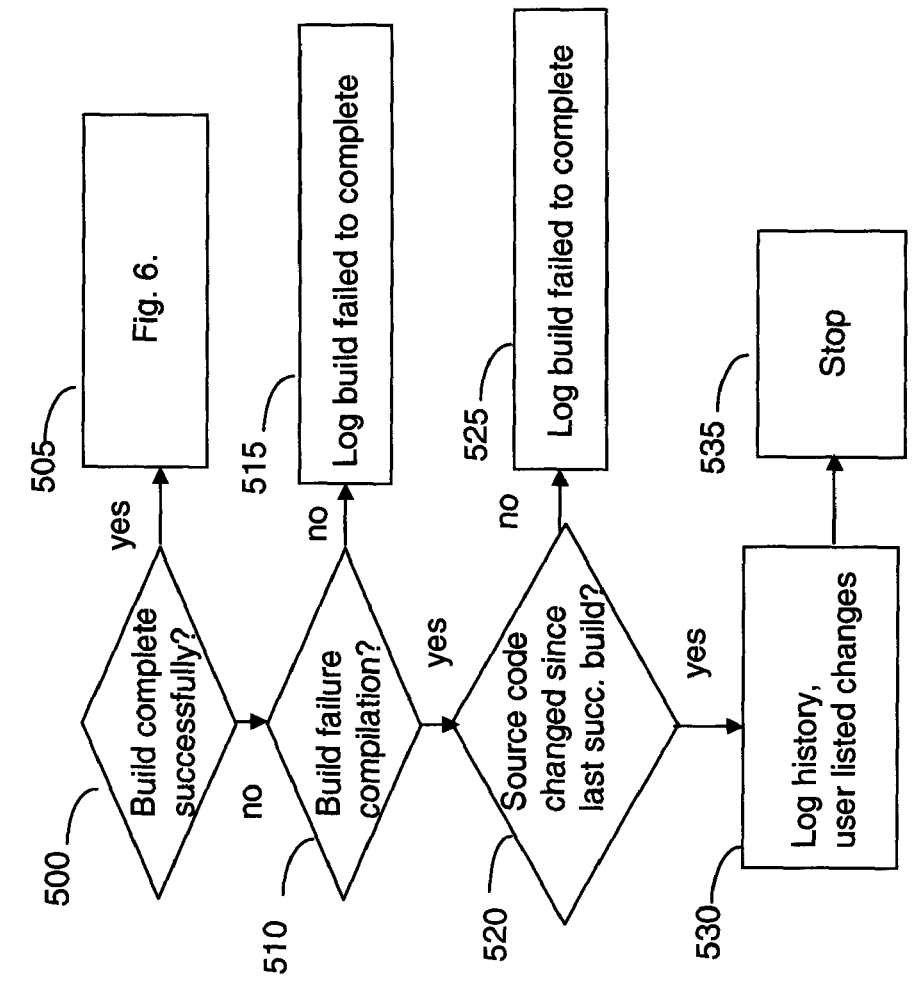
FIG. 5 is a flow chart detailing the process flows of the refactoring identification component in accordance with an embodiment of the disclosure.

Moving on to FIG. 5 a flow chart is shown depicting the typical steps performed by the RIE component. However, a person skilled in the art will realize that some steps may be omitted from this flow chart without departing from the scope of the invention.

Figure 6:
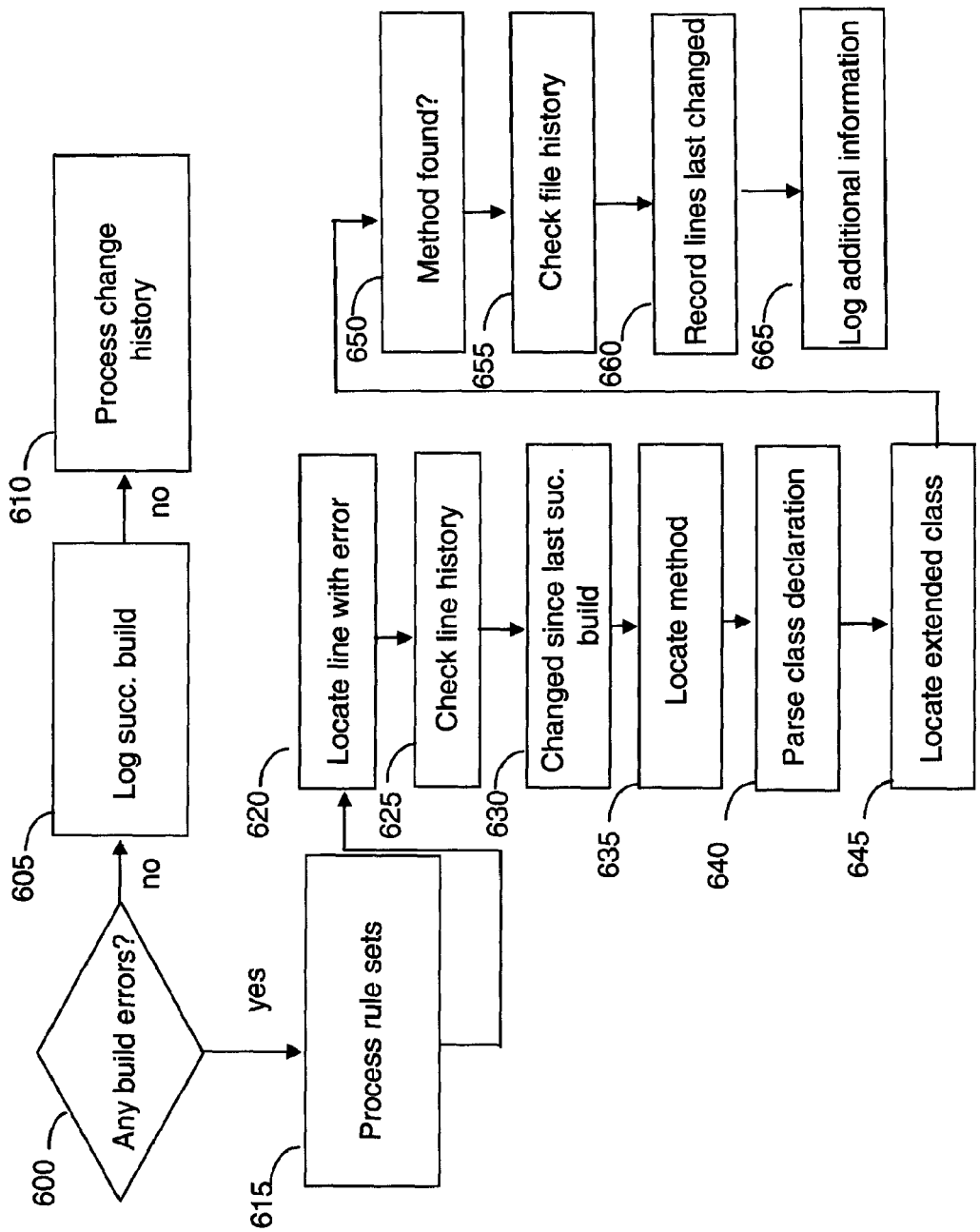
FIG. 6 is a flow chart detailing the process flows of handling build errors during a build operation in accordance with an embodiment of the disclosure.

At step 500, the parser component is triggered by the event of a build operation completing and determines whether the build completed successfully. In this instance, a successful build operation is characterized by the build operation completing and a build log being produced. If the build operation did complete successfully control moves to step 505 (FIG. 6). If a determination is made that the build did not complete successfully control moves to step 510 and a determination is made as to the type of build operation failure. For example, if the network was down or the data processing system failed to operate then control moves to step 515 where this information is logged. Moving back to step 510, if a determination is made that there was a failure was due to a complier error, control moves to step 520 and a further determination is made to identifier if the source code has changed since last successful build operation. If the determination is negative and the source code has not changed since the last successful build, control moves to step 525 and the information is recorded by the logging component. Control moves back to step 525 and if a determination is made that the source code has changed since the last successful build, control moves to step 530 and the log history of user listed changes is logged.

Moving back to step 505, if the build operation completed successfully, a determination is made at step 600, to determine whether the build log comprises any build errors. If the determination is that there are no build errors, the logging component records the successful build operation and process the change history. i.e. updates the history file associated with the processed build.

Moving back to step 600, if build errors are identified in the build logs, the parser component communicates with the rule set component to firstly identify which type of rule set is required. The parser component identifies from the build log an identified error. The parser component uses this identified error as a search criteria into a database of rule sets to identify the most appropriate rule set to use for processing. Thus, following on from this determination the relevant rule set is loaded into the memory of the logging component, at step 615.

Steps 620 to steps 670 explain an example rule set. However, a person skilled in the art will realize that different rules sets will perform a different number of process steps depending on what type of error has been identified. Thus, using the identified error of 'incompatible types', the parser component 455 begins by locating the source code file associated with the identified error in the build log file. The parser component 455 sends a request to the aggregator component 420 to request the communicator component 440 to return the source code file in question from the Source code management system. Once received, the parser component 455 locates the error identified at a particular line number and proceeds to check the change history associated with the line number at step 620 and 625. A determination is made at step 630 whether the line history has changed since the last successful build operation. If the determination is positive and the line of source code has been changed, in this rule set example, the change that has been made to the line of source code is recorded in the data store and the method construct is located, followed by the class declaration at steps 635 and 640. After parsing the local extended class declaration the method in the TestExtension.java file is found and again the file history is checked for any updates etc. The file history is then logged by the logging component along with any other additional information.

Thus the parser component 455 in combination with the rule sets component 460 is able to follow a hierarchical path through a number of source code constructs in order to identify the source code construct that is causing the compiler to report an error in the build log. Throughout the entire process the aggregator component 420 is recoding any changes in the history of lines of source that have been identified as changed since the last determined successful build operation. Thus a complete source code history can by compiled.

The compiled history provides a valuable information source for reporting. The reporting generator 480 in combination with the query component 475 is then able to provide statistical analysis about errors that occur frequently in compiler and non-compiler related operations. This output can then be used as input in to a refactoring application for refactoring source code elements and other associated software development aspects.

For the avoidance of doubt, the term "comprising", as used herein throughout the description and claims is not to be construed as meaning "consisting only of". It will be appreciated by those skilled in the art that the invention is not just limited to email messages, but is also applicable to other types of messages that have a distribution list that can be updated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for identifying build errors associated with a source code file for determining source code elements for refactoring, the method comprising:
   identifying an error associated with a build operation of a build management system;
   interfacing with a source code management system for locating a source code file associated with the identified error;
   analyzing the source code file to identify the identified error associated with the source code file;
   analyzing historical data associated with the identified error from the source code file;
   identifying from the historical data whether the source code associated with the identified error has been amended since a last logged successful build operation;
   identifying a source code construct dependency associated with the source code of the identified error and locating the source code file associated with the source code construct in response to a negative determination being made;
   identifying from the historical data associated with the identified source code file whether the source code associated with the identified error has been amended since a last logged successful build operation; and
   logging the identified error with the identified error's historical data for further analysis, in response to a positive determination.

2. The method as claimed in claim 1, further comprising:
   parsing a source code dependency hierarchy in order to identify the root cause of an error identified in a build operation.

3. The method as claimed in claim 1, wherein the build error comprises a compiler generated error.

4. The method as claimed in claim 2, further comprising:
   analyzing the logged historical data and generating a report detailing statistical analysis associated with the identified root cause of the error and wherein the statistical analysis details elements of source code that requires refactoring.

5. The method as claimed in claim 4, wherein, the statistical analysis of the generated report is input into a refactoring engine for refactoring the source code associated with the identified error.

6. The method as claimed in claim 1, wherein a build operation outputs a build log identifying source code elements that did not compile successfully.

7. The method as claimed in claim 1, further comprising:
   configuring a refactoring identification component for operability with a proprietary source code control management system and a proprietary build management system.

8. The method as claimed in claim 1, wherein the error is a an error identified in a build operation, wherein the error is comprises a network failure generated error.

9. The method as claimed in claim 1, further comprising:
logging a completed build operation and metadata associated with the completed build operation in response to a build operation being determined as completed.

10. A computer implemented method for identifying source code elements for refactoring, the method comprising:
identifying root cause of an error in a build operation, the identifying comprising:
selecting a type of build environment, a type of source code management system, a programming language from a database;
interfacing a refactoring identification component with the selected build environment and the source code management system for communicating with a data store, wherein the data store comprises build logs, source code files and configuration logic;
identifying a build error in a build operation;
identifying a build log associated with the build error;
identifying an error message and a source code file associated with the build error by parsing the build log;
receiving the identified source code file;
parsing the source code file for:
identifying a source code element associated with the error based on a rule set;
identifying metadata associated with the source code element;
determining whether the source code element has been amended after the last successful build operation;
when the source code element has not been amended after the last successful build operation, identifying a dependency of the source code element on a different source code construct; and
analyzing the different source code construct for cause of the error.

11. The method as claimed in claim 10, wherein analyzing the different source code construct comprises parsing a source code dependency hierarchy in order to identify the root cause of an error identified in the build operation.

12. The method as claimed in claim 11 further comprising:
analyzing data associated with build logs and generating a report detailing statistical analysis associated with the identified root cause of the error and wherein the statistical analysis details elements of source code that requires refactoring.

13. The method as claimed in claim 10, wherein the build error comprises a compiler generated error.

14. The method as claimed in claim 10, wherein the build error comprises a network failure generated error.

15. The method as claimed in claim 10, wherein the build operation outputs a build log identifying source code elements that did not compile successfully.

16. The method as claimed in claim 10, further comprising:
configuring the refactoring identification component for operability with a proprietary source code management system and a proprietary build management system.

* * * * *